United States Patent [19]

Liu

[11] Patent Number: 5,815,679
[45] Date of Patent: Sep. 29, 1998

[54] INTERFACE DEVICE FOR CONTROLLING COMPUTER PERIPHERALS

[75] Inventor: Johny Liu, Taipei, Taiwan

[73] Assignee: Primax Electronics, Ltd., Taipei Hsien, Taiwan

[21] Appl. No.: 681,536

[22] Filed: Jul. 23, 1996

[51] Int. Cl.[6] .................................................. H01J 13/00
[52] U.S. Cl. .......................... 395/309; 395/830; 395/832; 395/834; 395/882; 395/884; 395/892; 395/893
[58] Field of Search ...................................... 395/309, 310, 395/882, 883, 884, 892, 893, 500, 527, 520, 326, 830, 831, 832, 834, 311; 341/20, 21, 23; 345/160, 156, 157, 158; 340/706, 709, 710, 711

[56] References Cited

U.S. PATENT DOCUMENTS

| | | | |
|---|---|---|---|
| 5,317,693 | 5/1994 | Cuenod et al. | 395/821 |
| 5,349,675 | 9/1994 | Fitzgerald et al. | 395/800 |
| 5,457,478 | 10/1995 | Frank | 345/158 |
| 5,481,265 | 1/1996 | Russell | 341/22 |
| 5,485,171 | 1/1996 | Copper et al. | 345/160 |
| 5,537,104 | 7/1996 | Van Dort et al. | 340/825.52 |
| 5,537,608 | 7/1996 | Beatty et al. | 395/800 |
| 5,578,999 | 11/1996 | Matsuzawa et al. | 340/825.22 |
| 5,640,595 | 6/1997 | Baugher et al. | 395/830 |
| 5,644,790 | 7/1997 | Li et al. | 395/883 |
| 5,657,378 | 8/1997 | Haddock et al. | 379/93.23 |

*Primary Examiner*—Ayaz R. Sheikh
*Assistant Examiner*—Raymond N. Phan
*Attorney, Agent, or Firm*—Bacon & Thomas

[57] ABSTRACT

An interface device is adapted to control computer peripherals by directly executing drivers installed on the computer and respectively corresponding to the computer peripherals without interrupting currently open applications. The interface device includes a housing, a micro-processor located in the housing for generating control signals corresponding to the computer peripherals and transmitting the control signals to the computer to cause the computer to execute the drivers. A key pad device is located on one surface of the housing, including plural buttons which can be selected by the user to control the corresponding computer peripherals.

5 Claims, 3 Drawing Sheets

INTERFACE DEVICE FOR CONTROLLING COMPUTER PERIPHERALS

BACKGROUND OF THE INVENTION

1. Field of the Invention

The present invention relates to an interface device, and more particularly, to an interface device adapted to control computer peripherals.

2. Description of the Prior Art

Computer end users all know that when they want to excute one of the functions of computer peripherals, such as a CD-ROM for playing music, under the current Windows™ based operating system or graphical user interface (GUI), they have to at first skip away from the currently open applications, and then open a driver of the computer peripheral, so that the function of the same can be executed.

For most of the end users, such switching of GUI based applications will cause inconvenience in the user' operation of open applications, because the currently open applications must be interrupted from time to time to enable control of the computer peripheral.

SUMMARY OF THE INVENTION

It is therefore a primary objective of the present invention to provide an interface device for controlling computer peripherals providing a hardware implemented user interface for controlling computer peripherals without interrupting the currently open applications.

The interface device according to the present invention comprises:

(1) a housing;

(2) a micro-processor located in the housing for generating control signals corresponding to the computer peripherals and transmitting the control signals to a computer in order to execute the drivers for the computer peripherals upon receiving the control signals;

(3) a key pad device located on one surface of the housing including plural buttons which are selected by the users to control the corresponding computer peripherals.

In accordance with another aspect of the present invention, the drivers for controlling the computer peripherals, respectively, are installed in the computer.

In accordance with another aspect of the present invention, the present invention further comprises a display disposed on one surface of the housing for displaying the signals transmitted by the computer, a wireless signal receiver and a wireless signal transmitter for receiving and transmitting remote control signals, respectively.

In accordance with another aspect of the present invention, the key pad device further includes plural function keys used as an interface for controlling the computer peripherals, and plural numeral keys for inputting in connection with the computer peripherals.

The present invention may best be understood through the following description with reference to the accompanying drawings, in which:

DETAILED DESCRIPTION OF THE PREFERRED EMBODIMENT

Figure 1:
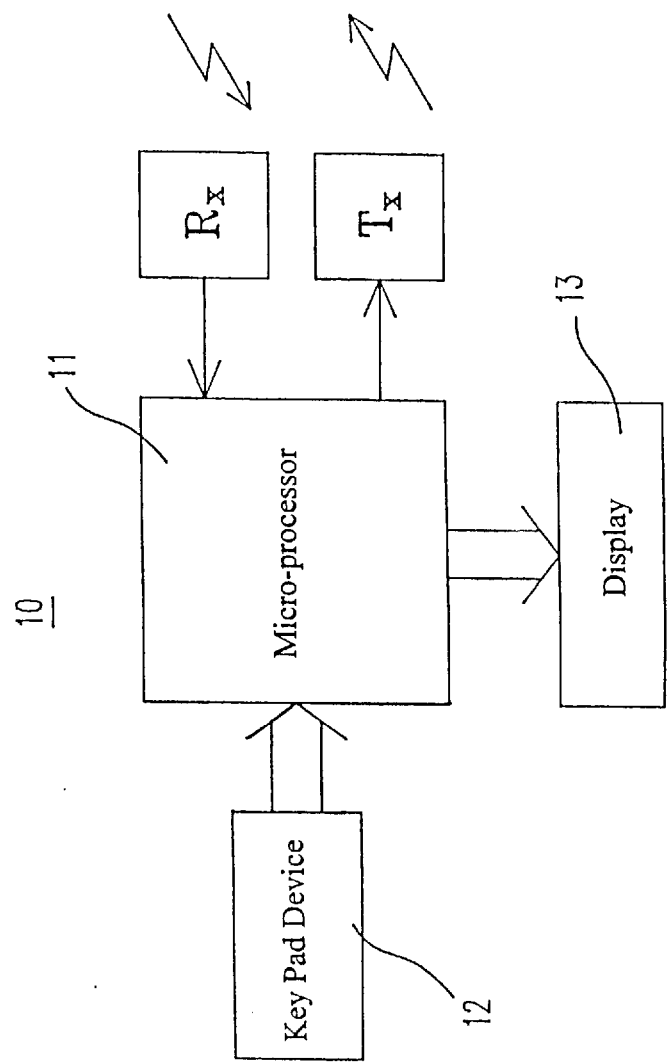
FIG. 1 is a block diagram illustrating an interface device according to the present invention.

Please refer to FIG. 1, which is a block diagram illustrating an interface device 10 according to the present invention. The interface device 10 is adapted to control computer peripherals and includes a micro-processor 11 for generating control signals corresponding to the computer peripherals and transmitting the control signals to the computer to cause the computer to execute software drivers for the computer peripherals upon receiving the control signal, a key pad device 12 for selecting the corresponding computer peripherals to be controlled, a display 13 for displaying the signals transmitted by the computer, and a wireless signal receiver Rx and a wireless signal transmitter Tx for receiving and transmitting remote control signals, respectively.

Figure 2:
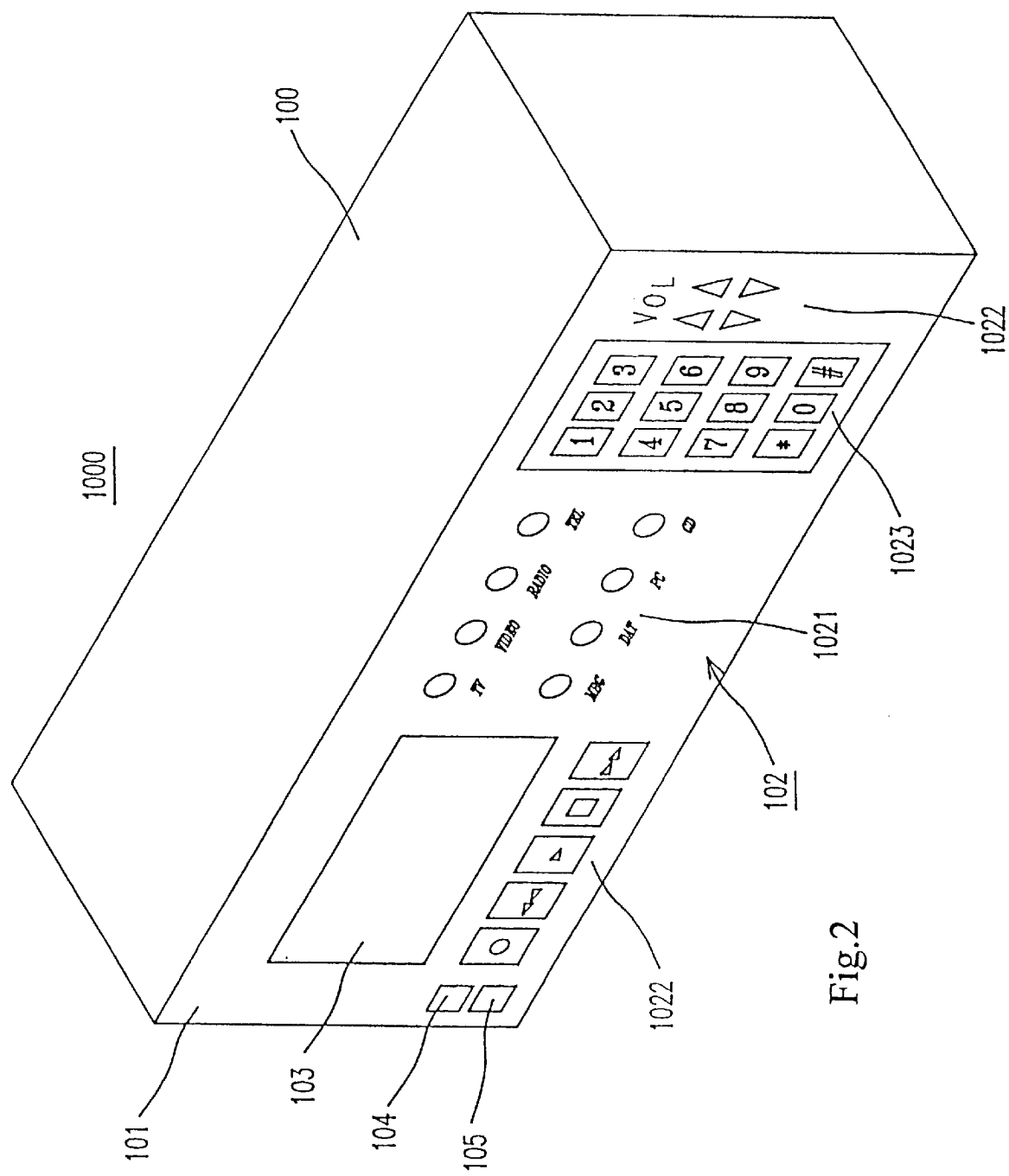
FIG. 2 is a perspective view of a preferred embodiment according to the present invention.

Please refer to FIG. 2, which is a perspective view of a preferred embodiment according to the present invention. The interface device 1000 adapted to control computer peripherals comprises a housing 100 in which a micro-processor (not shown in this figure) is provided. The key pad device 102, the display 103, the wireless signal receiver 104 and the wireless signal transmitter 105 are respectively disposed on one surface 101 of the housing 100. The key pad device 102 includes plural selection keys 1021 corresponding to the computer peripherals for capable of being selected in order to cause device 1000 to control the selected computer peripherals, such as a telephone, TV, CD-ROM, and modem, etc., through the computer. Device 1000 also includes function keys 1022 for controlling operation interfaces, such as volume and channel, of the computer peripherals, and numeral keys 1023 for inputting numeric data in connection with control of the computer peripherals. The display 103 is used to display information, such as, taking a CD-ROM as an for example, currently played programs, the information being transmitted by the computer, or to display information corresponding signals transmitted by the micro-processor 11. The wireless signal receiver 104 and the wireless signal transmitter 105 are used for allowing the interface device 1000 of the present invention to respectively receive and transmit remote signals, so that the interface device 1000 can either be directly accessed or operated in a remote-control manner.

Figure 3:
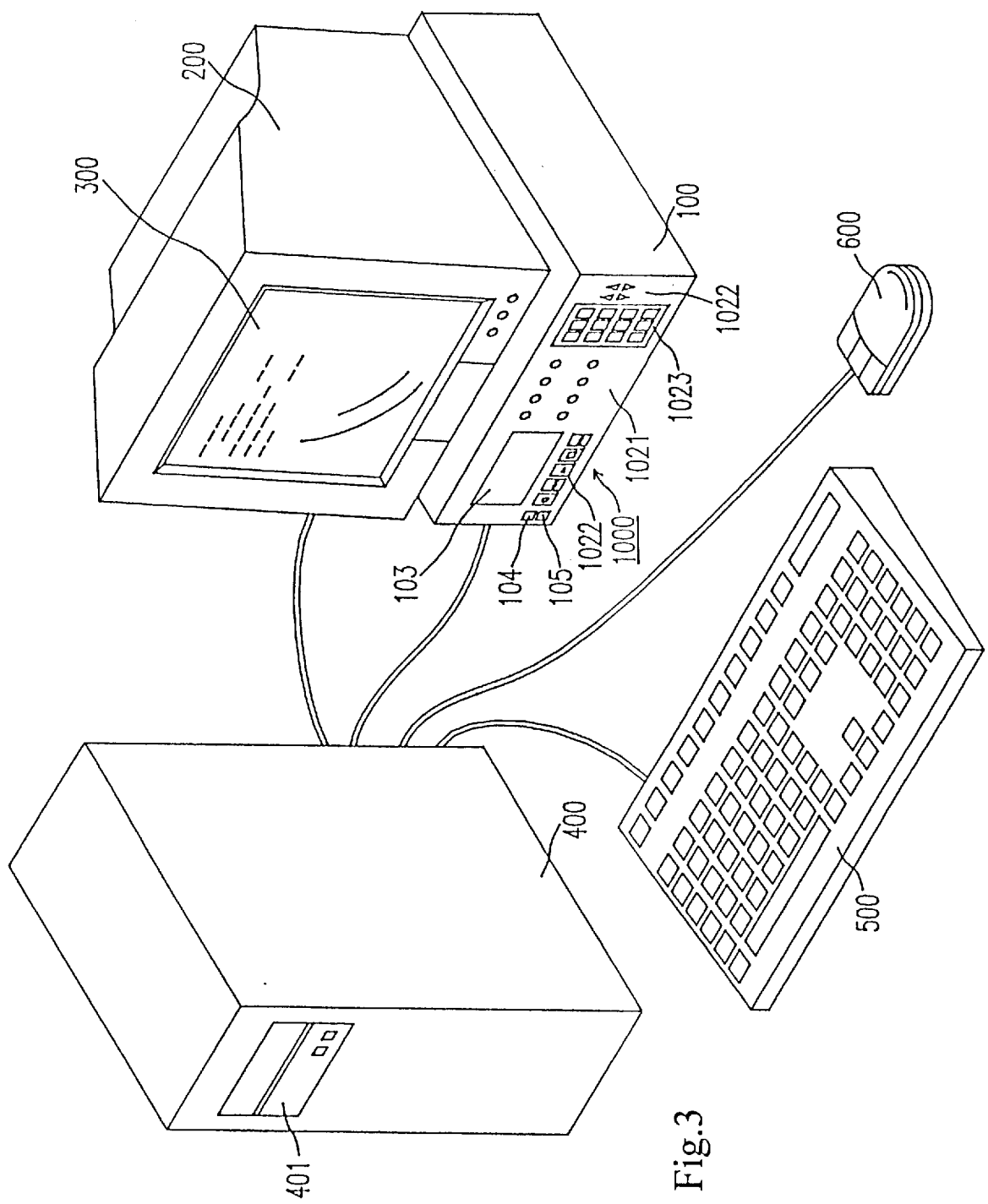
FIG. 3 is a perspective view of the interface device in use according to the present invention.

Please refer to FIG. 3, which is a perspective view of the interface device according to the present invention, showing the interface device 1000, a computer display 200, a personal computer 400, a CD-ROM 401, a keyboard 500 and a computer mouse 600.

In order to use the device, if the user wants to control a computer peripheral, such as the CD-ROM 401, not controlled by the currently open applications, he only needs to press one of the selection keys 1012 corresponding to the CD-ROM 401. A control signal of the CD-ROM 401 will be generated and transmitted to the computer 400, when the micro-processor 11 detects the pressing of the selection keys 1012. The central processing unit (CPU) in the computer 400 will then in coordination with a multiplexing program therein, automatically enable the driver of the CD-ROM 401 without interrupting the currently open applications on the computer display 200. After the computer peripheral is enabled, the other keys 1022, 1023 of the key pad device 102 can also be used as an operation interface for controlling the enabled computer peripheral, or for inputting datas therefrom.

The interface device of the present invention can be directly connected to any I/O port, such as an RS232 or can SCIC ports, or transmit signals in a remote-control manner via the wireless signal receiver and a remote controller connected to the interface device.

A convenient operation interface is therefore by the present invention, enabling the users to control computer peripherals by simply pressing buttons, so that the frequent switching of, for example, Windows™ based applications can be avoided when controlling the peripheral equipments. Furthermore, the computer peripherals can be operated and controlled without interrupting the currently open applications.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An interface device adapted to control computer peripherals connected to a computer, said computer including an operating system capable of running multiple software programs, including drivers for said computer peripherals, and providing a graphical user interface for permitting a user to interface with currently running programs, comprising:

(1) a housing;
   (2) a micro-processor located in said housing and including means for generating control signals corresponding to said computer peripherals and transmitting said control signals to said computer in order to directly execute drivers for said computer peripherals without interrupting said currently running programs;
   (3) a key pad device located on one surface of said housing including plural buttons for selecting which of said corresponding computer peripherals is to be controlled by said interface device.

2. The interface device of claim 1, further comprising a display disposed on one surface of said housing for displaying information corresponding to said signals transmitted to said computer.

3. The interface device of claim 2, further comprising a wireless signal receiver and a wireless signal transmitter for enabling said microprocessor to respectively receive and transmit wireless remote control signals.

4. The interface device of claim 3, wherein said key pad device further includes plural function keys by which function information can be input to said computer for use by said drivers in controlling said computer peripherals.

5. The interface device of claim 4, wherein said key pad device further includes plural numeral keys for inputting control data directly to said drivers in connection with control of said computer peripherals.

\* \* \* \* \*